(12) United States Patent
Xiao et al.

(10) Patent No.: US 11,584,282 B2
(45) Date of Patent: Feb. 21, 2023

(54) AUTOMATED ASSIST HANDLE FOR AUTOMOTIVE VEHICLE

(71) Applicant: Ford Global Technologies, LLC, Dearborn, MI (US)

(72) Inventors: Jevon Xiao, Dearborn, MI (US); Daniel Boccuccia, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 467 days.

(21) Appl. No.: 16/631,197

(22) PCT Filed: Jul. 18, 2017

(86) PCT No.: PCT/US2017/042667
§ 371 (c)(1),
(2) Date: Jan. 15, 2020

(87) PCT Pub. No.: WO2019/017923
PCT Pub. Date: Jan. 24, 2019

(65) Prior Publication Data
US 2020/0215951 A1   Jul. 9, 2020

(51) Int. Cl.
*B60N 3/02*  (2006.01)
*B60J 5/04*  (2006.01)
*E05B 1/00*  (2006.01)

(52) U.S. Cl.
CPC ............... *B60N 3/023* (2013.01); *B60J 5/04* (2013.01); *E05B 1/0015* (2013.01); *E05B 2001/0023* (2013.01)

(58) Field of Classification Search
CPC .. E05B 1/00; E05B 1/0015; E05B 2001/0023; B60N 3/00; B60N 3/02023; B60N 3/026; B60J 5/00; B60J 5/04

(Continued)

(56) References Cited

U.S. PATENT DOCUMENTS

| 7,032,953 B2 * | 4/2006 | Rangnekar | E05F 1/1269 16/366 |
| 2009/0108607 A1 * | 4/2009 | Browne | B60N 3/023 296/1.02 |

(Continued)

FOREIGN PATENT DOCUMENTS

| CN | 106555522 A | 4/2017 |
| CN | 106555522 * | 3/2019 | ............ E05B 81/54 |

OTHER PUBLICATIONS

Golson, J., "Why the Tesla Model X's doors open and close automatically," The Verge, dated Oct. 20, 2016, retrieved from Internet URL: <https://www.theverge.com/2016/10/20/13345440/tesla-model-x-autonomous-self-opening-door>, p. 1-2.

(Continued)

*Primary Examiner* — Nathan Cumar
(74) *Attorney, Agent, or Firm* — Brandon Hicks; Eversheds Sutherland (US) LLP (57) ABSTRACT

Techniques and examples pertaining to an assist handle implementable to an automotive vehicle are described. The assist handle is automatically deployed to provide ingress or egress assist to a passenger to enter or exit the automotive vehicle. Furthermore, the assist handle is automatically retracted when not in use. The deployment and the retraction of the assist handle is controlled by an electronic control unit (ECU) of the vehicle, through an actuator and a transmission mechanism, in response to a command sent from a body control module (BCM) of the vehicle, the command regarding an operation of a door of the vehicle. When retracted, the assist handle may be invisible to the passenger. The automotive vehicle may be an autonomous ride-sharing vehicle.

20 Claims, 6 Drawing Sheets

(58) Field of Classification Search
USPC .......................................................... 701/49
See application file for complete search history.

(56) References Cited

U.S. PATENT DOCUMENTS

2017/0075358 A1* 3/2017 Zhang .................. G06Q 10/047
2017/0130495 A1* 5/2017 Wheeler ................. E05B 83/16

OTHER PUBLICATIONS

International Search Report of the International Searching Authority for PCT/US2017/042667 dated Sep. 29, 2017.

* cited by examiner

FIG. 1

*Doors Closed*

*Doors Open*

FIG. 6

AUTOMATED ASSIST HANDLE FOR AUTOMOTIVE VEHICLE

TECHNICAL FIELD

The present disclosure generally relates to automotive vehicles and, more particularly, to grab handles that are automatically deployed to assist a passenger for easy ingress or egress of a vehicle.

BACKGROUND

Grab handles, or assist handles, are often provided as an accessory of an automotive vehicle. When entering or exiting an automotive vehicle, such as a car, a sedan, a minivan, a bus, a truck or the like (hereinafter referred to as a "vehicle"), a passenger may utilize a grab handle fixedly disposed at a location that is typically near a door of the vehicle. The passenger may grasp the grab handle during the entering or the exiting to facilitate an easy ingress or egress of the vehicle through the door. Namely, a grab handle provides the passenger with assistance for ingress/egress of the vehicle, and thus is hereinafter interchangeably referred to as an "assist handle". Some passengers, especially the elderly and the young, may benefit from the assist handles more than other passengers.

Since grab handles are designed to provide for assistance for ingress and egress, typically they are not utilized when the vehicle is moving and/or when the passenger is seated. Nevertheless, existing grab handles are fixedly disposed in the vehicle and visible to passengers of the vehicle, regardless whether they are utilized or not. Consequently, for most part of the operation of the vehicle when the vehicle is moving, the grab handles unnecessarily take up space inside the vehicle, and may even block views of the passenger(s) seated inside the vehicle.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1:
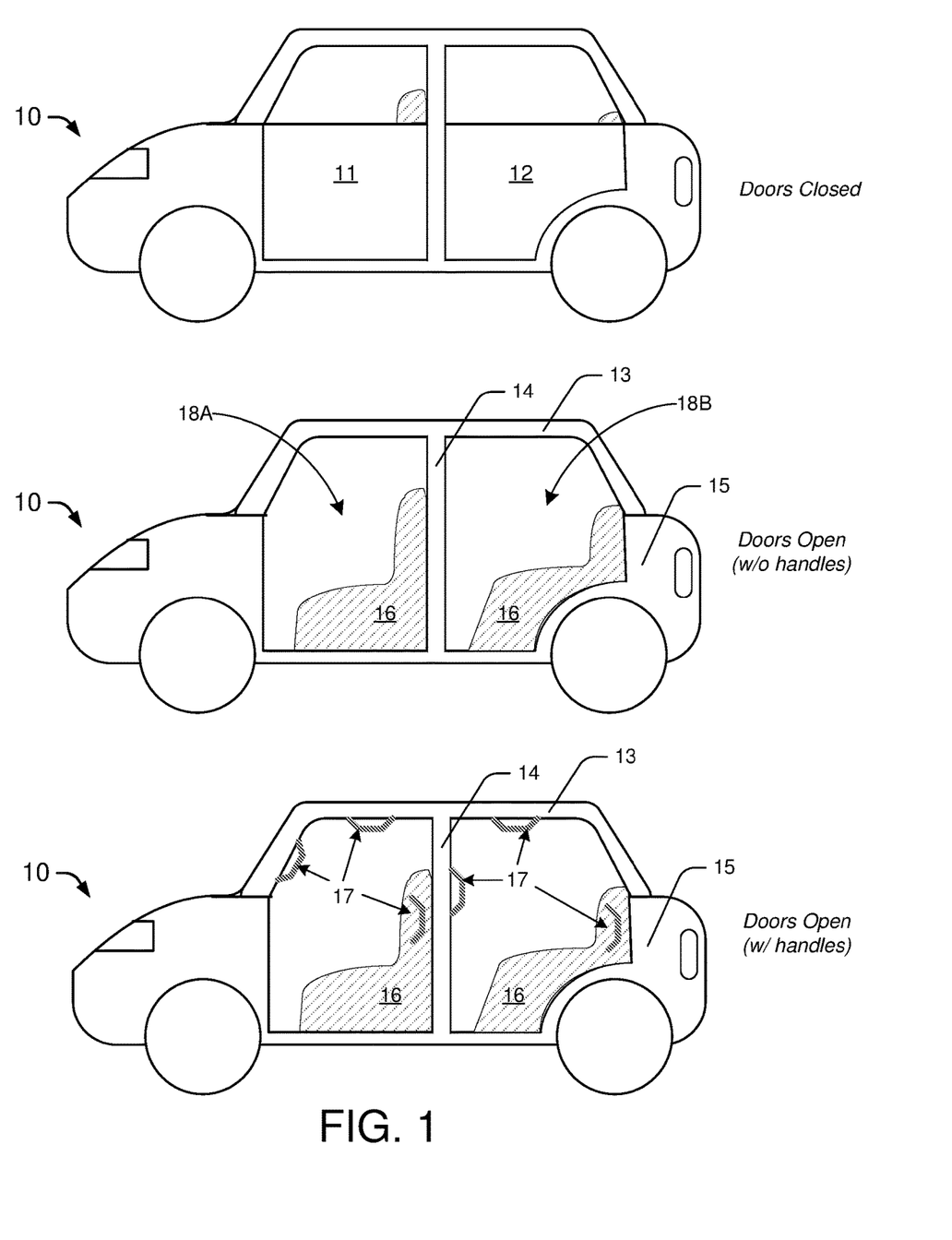
FIG. 1 is a diagram depicting an example scenario in which embodiments in accordance with the present disclosure may be utilized.

As mentioned above, assist handles or grab handles are useful in providing assistance for easy ingress or egress for a passenger to enter or exit a vehicle. Take vehicle 10 of FIG. 1 for example. Vehicle 10 is equipped with two doors, such as front door 11 and rear door 12, on one side or each side of vehicle 10 with the two doors being next to one another. A passenger of vehicle 10 may enter or exit vehicle 10 via either front door 11 or read door 12. With either or both front door 11 and rear door 12 opened, the passenger may hold onto a part of vehicle 10 to assist himself of herself in entering or exiting vehicle 10. The part of vehicle 10 the passenger holds onto may include a portion of roof panel 13, B-pillar 14, body side 15 or seats 16. The passenger may even hold onto a portion of front door 11 and/or rear door 12 that are opened. Assist handles, such as one or more grab handles 17 as shown in FIG. 1, may be provided as a means for the passenger to hold onto vehicle 10 for ingress or egress. The one or more grab handles 17 may be disposed on, connected with or otherwise embedded in roof panel 13, B-pillar 14, body side 15 and/or seats 16, as shown in FIG. 1. Alternatively or additionally, grab handles 17 may be disposed on front door 11 and/or rear door 12, facing the interior of vehicle 10.

Figure 2:
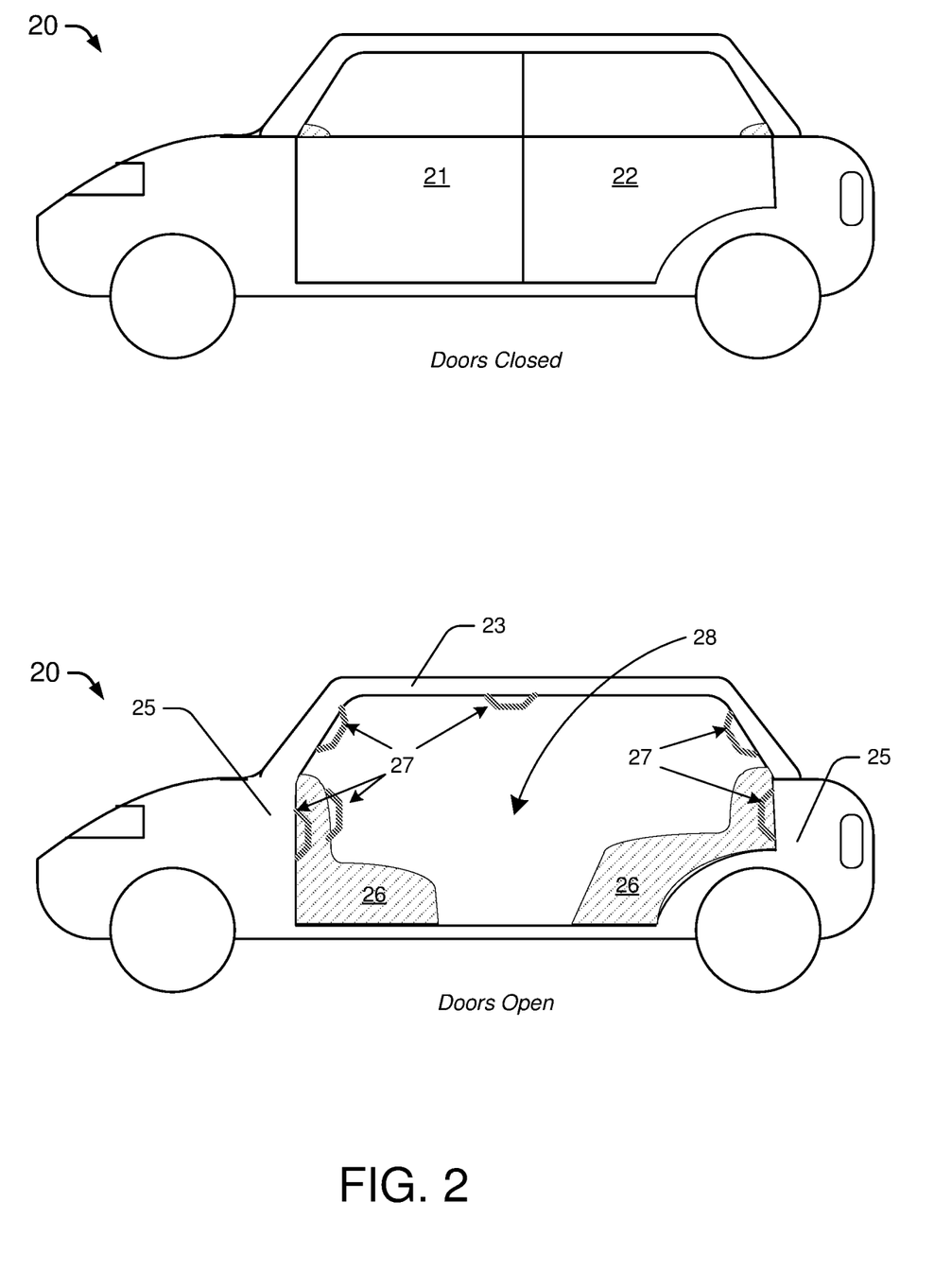
FIG. 2 is a diagram depicting another example scenario in which embodiments in accordance with the present disclosure may be utilized.

As shown in FIG. 1, B-pillar 14 is located between front door 11 and rear door 12. That is, when front door 11 and rear door 12 are both open, two separate openings 18A and 18B are resulted, through either of which a passenger may enter or exit vehicle 10. The passenger entering or exiting vehicle 10 may thus hold onto B-pillar 14, or a grab handle such as grab handle 17, for assistance with ingress or egress. Nevertheless, some vehicles (e.g., some autonomous vehicles) may lack a B-pillar. Such a vehicle may be designed to be B-pillar-less in order to maximize a size of an opening through which a passenger can enter or exit the vehicle. FIG. 2 shows a B-pillar-less vehicle 20 as an example. Vehicle 20 is equipped with two doors, such as front door 21 and rear door 22, which are next to one another and on one side or each side of vehicle 20. Front door 21 may open, either translationally or rotationally, toward the front of vehicle 20. Similarly, rear door 22 may open, either translationally or rotationally, toward the rear of vehicle 20. As there is not a B-pillar between front door 21 and rear door 22, a single opening 28 is resulted on the side of vehicle 20 when both front door 21 and rear door 22 are opened. That is, no more than one opening is resulted on the side of vehicle 20 for a passenger to enter or exit vehicle 20 when either or both of front door 21 and rear door 22 is/are opened.

In some embodiments, vehicle 20 may be a ride-sharing autonomous vehicle which drives autonomously and does not require a human driver. Therefore, most of the internal space of vehicle 20 is used for seating passengers. Operation of vehicle 20 may involve frequent pick-ups and drop-offs of passengers at various locations, as vehicle 20 is a ride-sharing vehicle. Thus, it is essential for vehicle 20 to provide easy ingress and egress for the passengers. Without a B-pillar similar to B-pillar 14 of vehicle 10 shown in FIG. 1, it is even more essential that vehicle 20 has one or more grab handles 27, as shown in FIG. 2, to provide assistance with ingress/egress to the passengers. Similar to grab handles 17 of FIG. 1, the one or more grab handles 27 of FIG. 2 may be disposed at, connected with or otherwise embedded in roof panel 23, body side 25 and/or seats 26 of vehicle 20. Alternatively or additionally, grab handles 27 may be disposed on front door 21 and/or rear door 22, facing the interior of vehicle 20.

For most of the time during which a passenger is seated inside a vehicle when the vehicle is moving, the one or more grab handles are likely not being utilized, but take up precious space inside the vehicle as they are often fixedly disposed in the vehicle. Moreover, aesthetically speaking, grab handles may be unsightly for at least some passengers. In some cases, fixedly disposed grab handles may become hindrance to motion or view of a seated passenger. To avoid or otherwise ameliorate the aforementioned disadvantage of fixedly disposed grab handles when not in use, the present disclosure proposes an automated grab handle (AGH) that is deployed when needed. That is, the AGH in accordance with the present disclosure may be automatically deployed when it is needed by a passenger, and may be automatically retracted when it is no longer needed, as detailed below.

Figure 3:
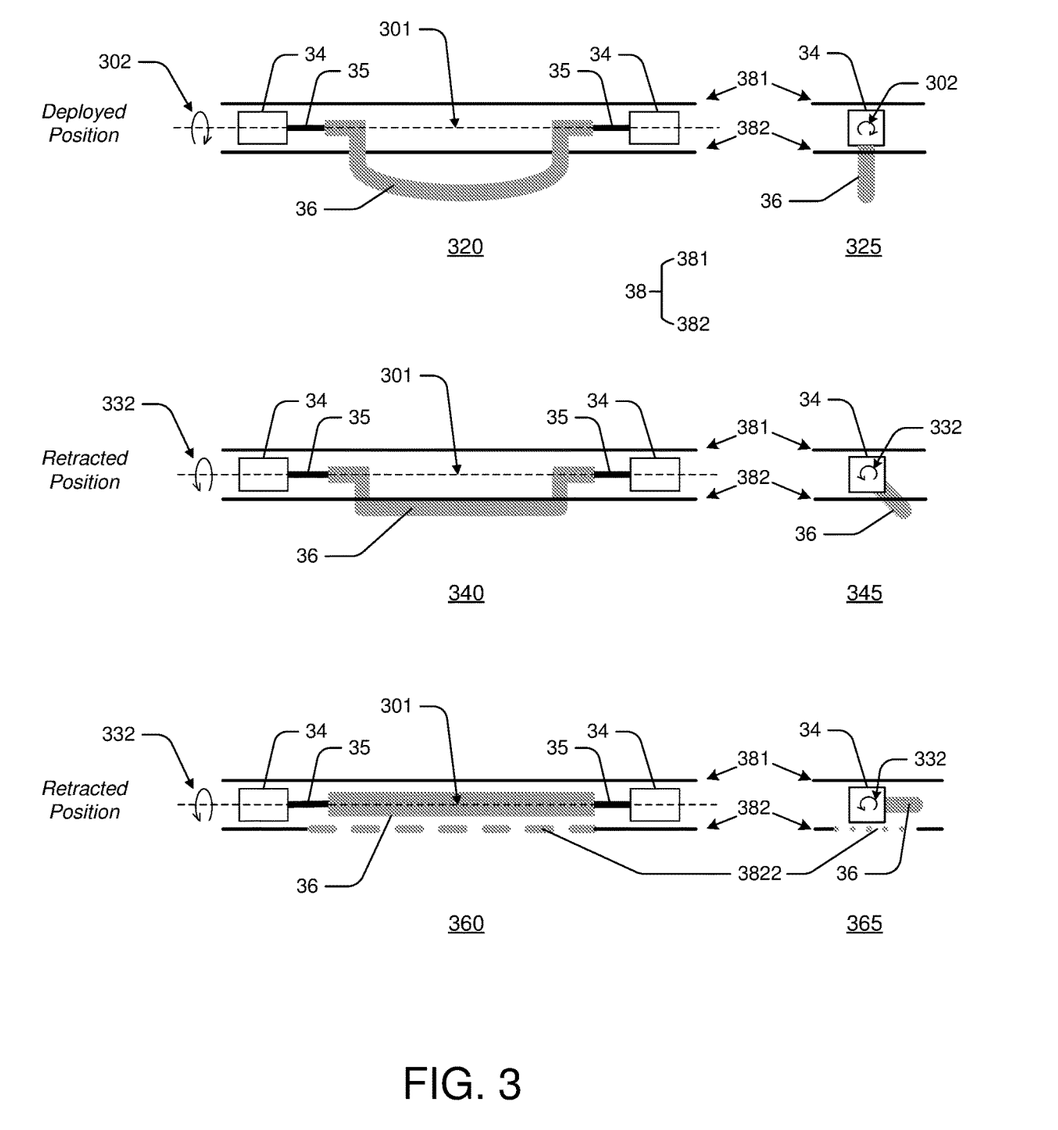
FIG. 3 is a diagram depicting an example automated grab handle in accordance with an embodiment of the present disclosure.

FIG. 3 shows an example embodiment of the mechanical portion of the AGH. As shown in various views 320, 325, 340, 345, 360 and 365 of the AGH, the mechanical portion of the AGH may include one or more actuators 34, a handle 36 onto which a passenger can hold, and a respective transmission mechanism 35 coupled between each of the one or more actuators 34 and handle 36. An imaginary primary axis 301 may be defined for the AGH along the one or more actuators 34, transmission mechanisms 35 and handle 36 thereof. View 320 depicts the AGH in a deployed position in which the AGH may be utilized by a passenger to enter or exit a vehicle (e.g., vehicle 10 and/or vehicle 20). View 325 depicts the AGH of view 320 as seen along primary axis 301. View 340 depicts the AGH of an embodiment in a partially retracted position in which the AGH may not be utilized by a passenger. View 345 depicts the AGH of view 340 as seen along primary axis 301. View 360 depicts the AGH of another embodiment in a fully retracted position in which the AGH may not be utilized by a passenger. View 365 depicts the AGH of view 360 as seen along primary axis 301.

Each of the one or more actuators 34 may be controlled to move or otherwise rotate, via transmission mechanisms 35, handle 36 between a deployed position (as shown in views 320 and 325) and a retracted position (as shown in views 340 and 345 or views 360 and 365). That is, the one or more actuators 34 may be controlled to deploy, via transmission mechanisms 35, handle 36 from the partially or fully retracted position of either view 340 or view 360, respectively, to the deployed position of view 320 by a rotational motion 302 around primary axis 301. Similarly, the one or more actuators 34 may be controlled to retract, via transmission mechanisms 35, handle 36 from the deployed position of view 320 to the partially or fully retracted position of either view 340 or view 360, respectively, by a rotational motion 332 around primary axis 301, with rotational motion 332 being in a reverse direction of rotational motion 302.

Each of the one or more actuators 34 may include components that can move handle 36 via rotational motions 302 and 332. For instance, each of the one or more actuators 34 may use electricity, magnetism, hydraulics, springs and/or any other suitable means to achieve the purpose. In some embodiments, at least one of the one or more actuators 34 may include a motor. In some embodiments, at least one of the one or more actuators 34 may include a loaded spring. Transmission mechanisms 35 may include a physical linkage, gears, rods, or any other suitable means to deliver torque and/or drive from the one or more actuators 34 to handle 36.

As shown in FIG. 3, the one or more actuators 34 and transmission mechanisms 35 may be disposed in a space 38 between an outer surface 381 of a vehicle and an inner surface 382 of the vehicle (e.g., vehicle 10 and/or vehicle 20). For example, outer surface 381 may be the external surface of the roof of the vehicle, inner surface 382 may be the headliner of the vehicle, and space 38 may be an internal space or void within the roof panel of the vehicle. As another example, outer surface 381 may be the external surface of the body side of the vehicle, inner surface 382 may be an inner surface on the side of the vehicle, and space 38 may be an internal space or void within the body side of the vehicle. Alternatively, the one or more actuators 34 and transmission mechanisms 35 may be embedded in or otherwise connected to a seat or a door of the vehicle.

In some embodiments, the AGH may be visible to the passenger when in the partially retracted position. In some embodiments, the AGH may be invisible to the passenger when in the fully retracted position. For example, in the partially retracted view of 340 and 345, handle 36 is rested against inner surface 382 when retracted, and thus is visible to a passenger seated inside the vehicle. In contrast, in the fully retracted view of 360 and 365, handle 36 is completely retracted into space 38 to become invisible to a passenger seated inside the vehicle, since handle 36 may be covered by a cover 3822. Cover 3822 may be an opaque solid cover that can slide over handle 36 automatically to obstruct a line of sight from the passenger. Alternatively, cover 3822 may be a soft cover (e.g., made of rubber-like material) having a slit thereon, whereas handle 36 may be able to move through the slit between the deployed position and the retracted position.

It is worth noting that, although more than one actuator 34 and more than one transmission mechanism 35 are shown in FIG. 3, it is not meant to be a limitation of the present disclosure. In some embodiments, an AGH may have a single actuator 34 and a single transmission mechanism 35 coupled between the actuator 34 and the handle 36. That is, a single actuator 34 may be sufficient to deploy and retract handle 36 through a single transmission mechanism 35, without the need for additional actuator(s) or additional transmission mechanism(s).

Figure 4:
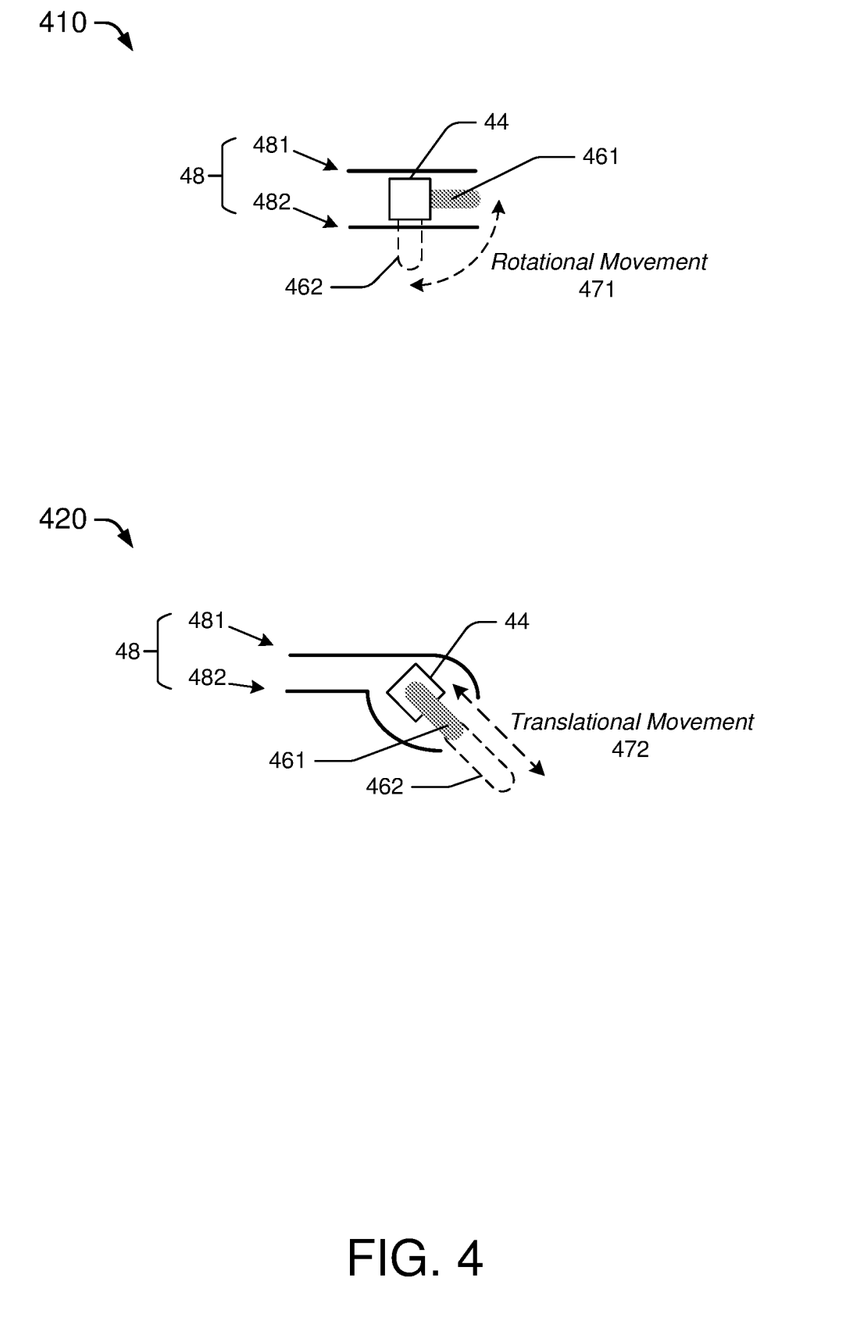
FIG. 4 is a diagram depicting example methods to rotationally or translationally deploy and retract an automated grab handle in accordance with an embodiment of the present disclosure.

FIG. 4 depicts example embodiments 410 and 420 to rotationally or translationally deploy and retract an AGH in accordance with the present disclosure. Embodiments 410 and 420 are illustrated along the primary axis of the respective AGH, similar to views 325, 345 and 365 of FIG. 3. Similar to the AGH of FIG. 3, the AGH of each of embodiments 410 and 420 may have its actuator(s) 44 and transmission mechanism(s) disposed within space 48 between an outer surface 481 of the vehicle and an inner surface 482 of the vehicle (e.g., vehicle 10 and/or vehicle 20). Specifically, AGH of embodiment 410 may be rotationally deployed and retracted between a retracted position 461 and a deployed position 462 via a rotational movement 471, in way similar to that of the AGH of FIG. 3. In contrast, AGH of embodiment 420 may be translationally deployed and retracted between a retracted position 461 and a deployed position 462 via a translational or otherwise linear movement 472. The translational movement 472 may be caused by actuator(s) 44 through one or more transmission mechanisms (not shown in FIG. 4). As with the AGH of views 360 and 365 of FIG. 3, the AGH of view 410 and the AGH of view 420 may be invisible to a passenger when in their respective retracted position 461.

Figure 5:
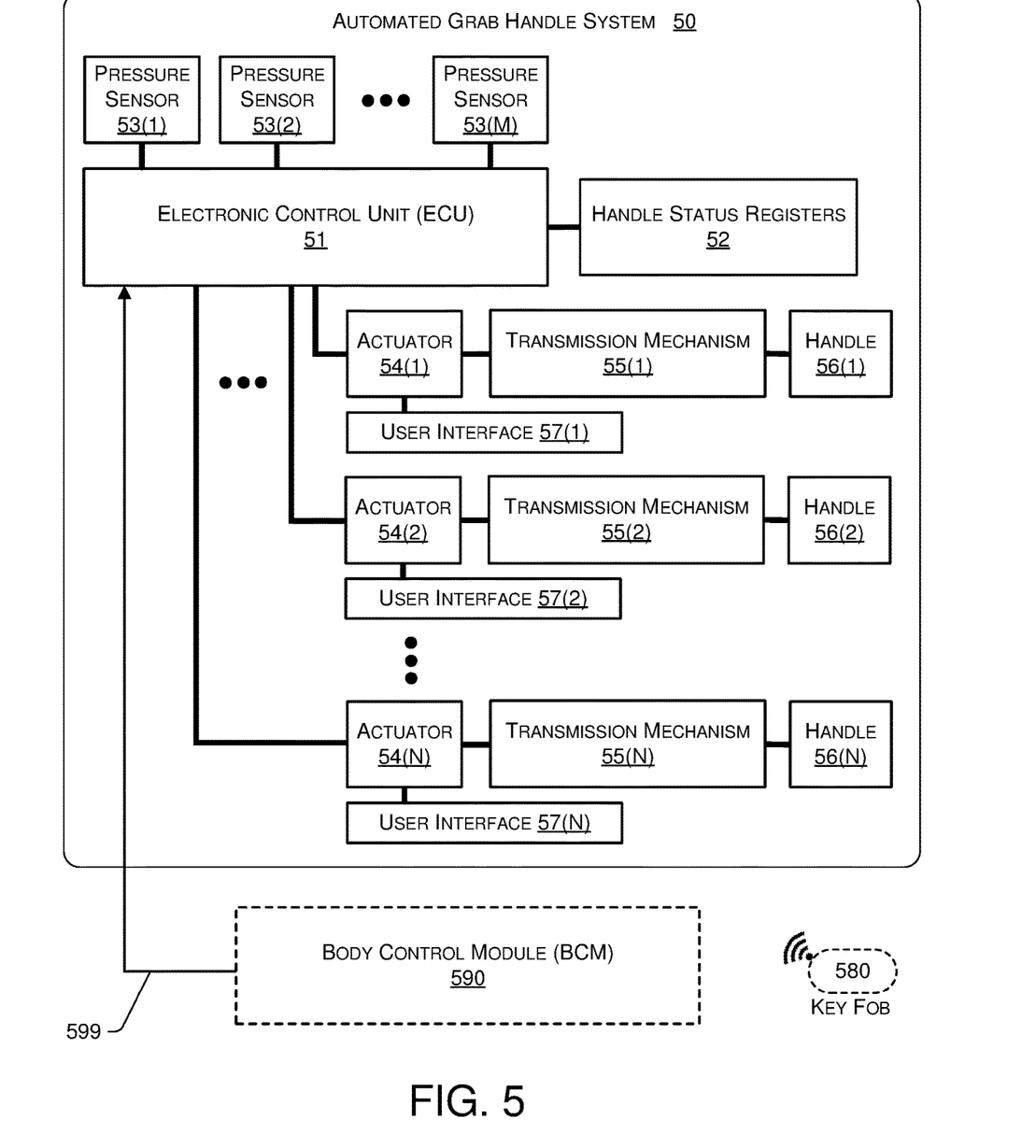
FIG. 5 is a block diagram depicting an example apparatus in accordance with an embodiment of the present disclosure.

FIG. 5 illustrates an example block diagram of an AGH system 50, as well as how it may interact with a body control module (BCM) 590 of a vehicle with which the AGH system 50 may be implemented. BCM 590 may be, for example, the central control console, or the "brain", of automotive electronics of the vehicle, responsible for monitoring and/or controlling various electronic accessories of the vehicle (e.g., vehicle 10 and/or vehicle 20). For example, BCM 590 may monitor and control electronic accessories of the vehicle such as power doors, power windows, power mirrors, power locking, headlights, air conditioning, immobilizer, and the like. In general, BCM 590 is disposed on or in the vehicle.

AGH system 50 may be employed to control a quantity of N of AGHs disposed in the vehicle, with each AGH comprising a handle, one or more actuators (such as actuators 34 of FIG. 3 or actuators 44 of FIG. 4) and one or more transmission mechanisms (such as transmission mechanisms 35 of FIG. 3). Here, N is a positive integer equal to or greater than 1. AGH system 50 may include an electronic control unit (ECU) 51 that is configured to control a number of actuators 54(1)-54(N). Each of actuators 34 of FIG. 3 and actuators 44 of FIG. 4 may be an example implementation of actuators 54(1)-54(N). Each of actuators 54(1)-54(N) may be coupled to a respective one of handles 56(1)-56(N) through a respective one of transmission mechanisms 55(1)-55(N). Each of transmission mechanisms 35 of FIG. 3 may be an example implementation of transmission mechanisms 55(1)-55(N). Handle 36 of FIG. 3 and the handle in positions 461 or 462 of FIG. 4 may be an example implementation of handles 56(1)-56(N). In general, ECU 51 may be also disposed on or in the vehicle.

ECU 51 may control, based on an input 599 from BCM 590, the actuators 54(1)-54(N) to move or rotate the respective handle(s) of handles 56(1)-56(N) through the respective transmission mechanism(s) of transmission mechanisms 55(1)-55(N). Each handle that is moved or rotated may be moved between a retracted position and a deployed position as illustrated in FIGS. 3 and 4. Input 599 received by ECU 51 from BCM 590 may include a door-operation command to operate (i.e., to open or close) one or more doors of the vehicle. In some embodiments, the door-operation command may further indicate which specific door(s) is/are to be opened or closed. Based on the door-operation command of input 599, ECU 51 may determine which handle(s) of handles 56(1)-56(N) is/are to be deployed or retracted in response to input 599. For example, in response to a door-operation command to open the rear left door of the vehicle, ECU 51 may determine to deploy one or more handles that is/are close to the rear left door. As another example, in response to a door-operation command to close right-side sliding doors of the vehicle, ECU 51 may determine to retract one or more handles that is/are close to the right-side sliding doors. In some embodiments, each of ECU 51 and BCM 590 may be implemented in the form of one or more processors such as one or more integrated-circuit (IC) chips.

In some embodiments, the door-operation command of input 599 may not specify which door(s) is/are to be operated upon, and in such cases ECU 51 may determine to deploy or retract each of handles 56(1)-56(N) in response to input 599. That is, if the door-operation command of input 599 simply indicates to open one or more doors, but does not indicate which door(s) to open, ECU 51 may control each of actuators 54(1)-54(N) to deploy handles 56(1)-56(N) to their respective deployed positions. In contrast, if the door-operation command of input 599 simply indicates to close one or more doors, but does not indicate which door(s) to close, ECU 51 may control each of actuators 54(1)-54(N) to retract handles 56(1)-56(N) to its/their respective partially or fully retracted position.

In some embodiments, AGH system 50 may include a plurality of sensors, such as pressure sensors 53(1)-53(M) of FIG. 5, to sense which seat(s) may be occupied by passenger (s). The vehicle may include M seats for passengers, and each of pressure sensors 53(1)-53(M) may be disposed at a respective seat of the vehicle. Here, M is a positive integer greater than 1. Thus, ECU 51 may be able to detect which seat(s) may be currently occupied by a passenger or passengers. In response to input 599 that includes a door-operation command to open one or more doors but does not indicate which door(s) to open, ECU 51 may determine that the door-operation command intends to open the door(s) that is/are close to seat(s) currently being occupied by a passenger or passengers, as sensed by pressure sensors 53(1)-53(M), and then deploy one or more of handles 56(1)-56(N) that is/are close to the occupied seat(s) to its/their respective deployed position.

In some embodiments, each of actuators 54(1)-54(N) of AGH system 50 may be coupled to a respective one of user interfaces 57(1)-57(N). Each of user interfaces 57(1)-57(N) may include a sensor, a button, a voice recognition circuit or other means of human-machine interface, to receive a signal directly from a passenger to operate the respective one of handles 56(1)-56(N) accordingly. For example, user interface 57(1) may include a proximity sensor which, upon sensing a hand of a passenger, may actuate actuator 54(1) to deploy handle 56(1) via transmission mechanism 55(1). As another example, user interface 57(2) may include a switch button which, upon being pressed by a passenger, may actuate actuator 54(2) to deploy or retract handle 56(2) through transmission mechanism 55(2).

In some embodiments, AGH system 50 may also include handle status registers 52, which keep track of immediate status of each of handles 56(1)-56(N) as currently deployed or retracted. After ECU 51 determines to deploy or retract a particular one of handles 56(1)-56(N) based on the door-operation command of input 599, ECU 51 may check handle status registers 52 for a current status of the particular handle. If handle status registers 52 indicates that the particular handle is already in the intended status of being deployed or retracted (as often a result of manual operation of the particular handle by a passenger through the corresponding one of user interfaces 57(1)-57(N)), ECU 51 would thus not need to operate the particular handle.

The deployment/retraction of handles 56(1)-56(N) may be synchronized with the opening/closing of a door of the vehicle. That is, a handle of handles 56(1)-56(N) is being deployed from the retracted position to the deployed position at the same time a door of the vehicle is being opened, and being retracted from the deployed position to the retracted position at the same time a door of the vehicle is being closed. In some embodiments, however, input 599 may further include a time advance/delay information defining a time difference between the deployment/retraction of a handle and the opening/closing of a door, and ECU 51 may deploy or retract the handle according to the time advance/delay information. That is, ECU 51 may deploy one or more handles 56(1)-56(N) before a door is opened by an amount of time indicated by the time advance/delay information of input 599. Likewise, ECU 51 may retract one or more handles 56(1)-56(N) after a door is closed by an amount of time indicated by the time advance/delay information of input 599. The time difference may improve user experience, as a passenger may already intend to utilize a grab handle before the door is opened, and may intend to continue holding onto the grab handle for at least a short period of time after the door is closed. Alternatively, as described above, a user interface coupled to an actuator may include one or more sensors for determining the right timing to deploy or retract a AGH. For example, user interface 57(1) may include a proximity sensor. A passenger may reach his or her hand toward the proximity sensor, indicating an intention to use handle 56(1), even before a door-operation command as part of input 599 is received by ECU 51. The proximity sensor, upon sensing the hand of the passenger, may actuate actuator 54(1) and deploy handle 56(1) via transmission mechanism 55(1), even if a door of the vehicle is not being opened. Likewise, in some embodiments, user interface 57(1) may also include a force sensor. A passenger may continue holding onto handle 56(1) in the deployed position, even after a door is closed. The force sensor, upon sensing a force still being exerted, may notify to maintain handle 56(1) in the deployed position until the exerted force is sensed to have been removed, and then actuator 54(1) may retract handle 56(1) from the deployed position to the retracted position via transmission mechanism 55(1).

It is worth noting that, in some embodiments, the door-operation command of input 599 received by ECU 51 from BCM 590 may be directly initiated by the passenger touching an operation button or operating a door handle associated with a door of the vehicle. In some embodiments, the door-operation command of input 599 received by ECU 51 from BCM 590 may be originally initiated by a remote key fob associated with the vehicle, such as key fob 580 of FIG. 5, that communicate wireless with BCM 590. Key fob 580 may have respective open and close buttons for each door of the vehicle, and the door-operation command may be initiated by a user pressing one or more of the respective open and close buttons on key fob 580.

Figure 6:
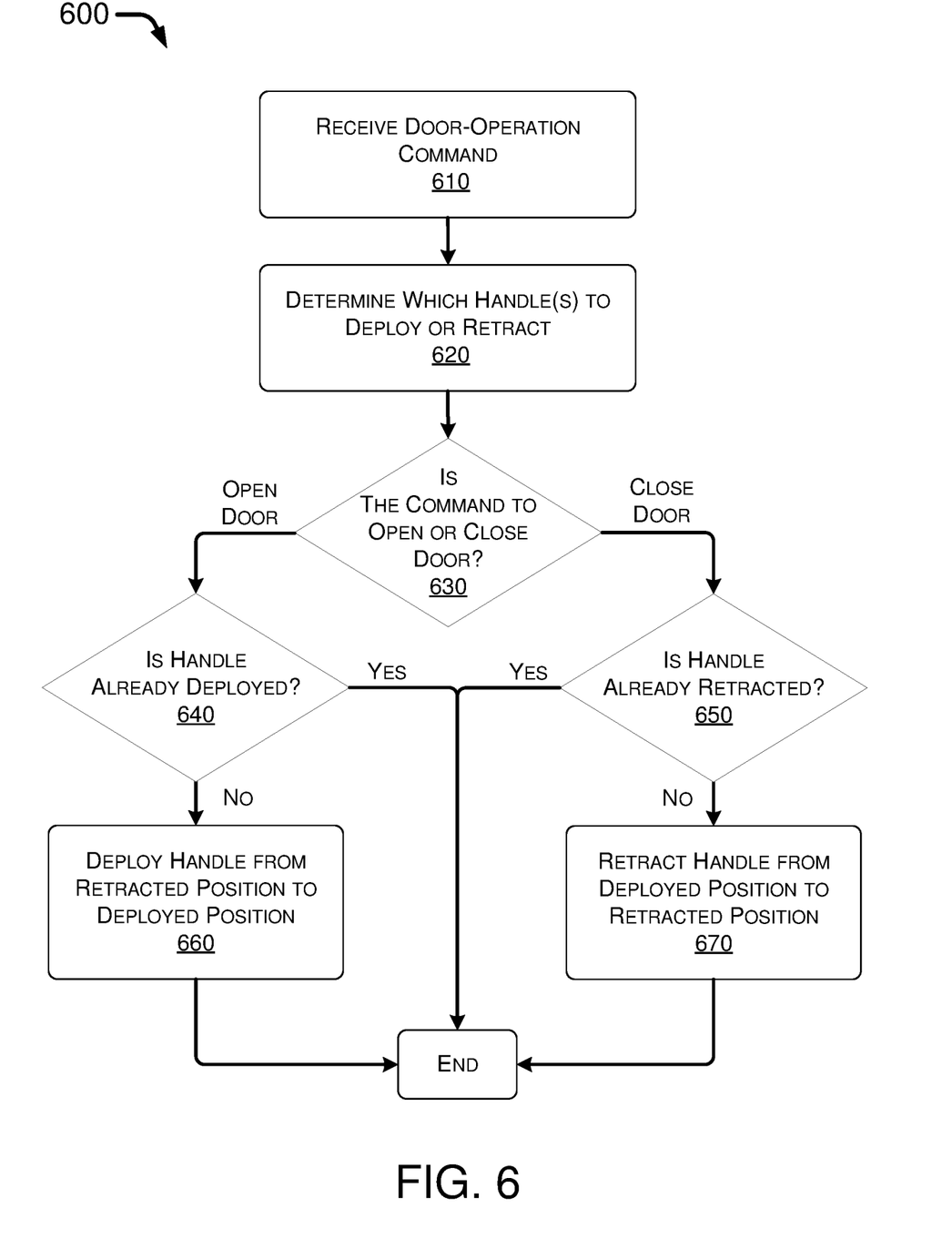
FIG. 6 is a flowchart depicting an example process in accordance with an embodiment of the present disclosure.

FIG. 6 illustrates an example process 600 for operating (e.g., deploying and retracting) an AGH in accordance with the present disclosure. Process 600 may include one or more operations, actions, or functions shown as blocks such as 610, 620, 630, 640, 650, 660 and 670. Although illustrated as discrete blocks, various blocks of process 600 may be divided into additional blocks, combined into fewer blocks, or eliminated, depending on the desired implementation. Process 600 may be implemented by AGH system 50 of FIG. 5 in vehicle 10 and/or vehicle 20. Process 600 may begin with block 610.

At 610, process 600 may involve ECU 51 (e.g., a first processor) receiving from BCM 590 (e.g., a second processor) a door-operation command as part of input 599. The door-operation command may indicate whether to open or close one or more doors of the vehicle. In some embodiments, the door-operation command may further indicate which one or more doors of the vehicle are to be opened or closed. Process 600 may proceed from 610 to 620.

At 620, process 600 may involve ECU 51 determining which handle(s) of handles 56(1)-56(N) are to deploy or retract. The handles to deploy or retract may be determined to be the ones close to the one or more doors to be opened or closed, as indicated by the door-operation command of input 599. In some embodiments where the door-operation command does not indicate which one or more doors to be opened or closed, ECU 51 may utilize pressure sensors 53(1)-53(M) to determine the one or more doors close to seat(s) being occupied by one or more passengers, as described above. In some embodiments, ECU 51 may determine to deploy or retract all of handles 56(1)-56(N) in lack of pressure sensors 53(1)-53(M). Process 600 may proceed from 620 to 630.

At 630, process 600 may involve ECU 51 identifying whether the door-operation command intends to open or close one or more doors of the vehicle. In an event that the door-operation command intends to open one or more doors, process 600 may proceed from 630 to 640. In an event that the door-operation command intends to close one or more doors, process 600 may proceed from 630 to 650.

At 640, process 600 may involve ECU 51 checking handle status registers 52 whether each of the handle(s) to be deployed has already been deployed. In an event that a handle to be deployed has been deployed according to handle status registers 52, process 600 may terminate at 640. In an event that a handle to be deployed has not yet been deployed according to handle status registers 52, process 600 may proceed from 640 to 660.

At 650, process 600 may involve ECU 51 checking handle status registers 52 whether each of the handle(s) to be retracted has already been retracted. In an event that a handle to be retracted has been retracted according to handle status registers 52, process 600 may terminate at 650. In an event that a handle to be retracted has not yet been retracted according to handle status registers 52, process 600 may proceed from 650 to 670.

At 660, process 600 may involve ECU 51 actuating corresponding one or more of actuators 54(1)-54(N) to deploy the respective handle(s) from their retracted positions to their deployed positions.

At 670, process 600 may involve ECU 51 actuating corresponding one or more of actuators 54(1)-54(N) to retract the respective handle(s) from their deployed positions to their retracted positions.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:

1. A method, comprising:
receiving, by a first processor from a second processor, a command to operate at least one door of a vehicle;
identifying one or more assist handles in a vicinity of the at least one door;
determining whether the at least one door is in an open configuration or a closed configuration;
determining whether the one or more assist handles are in a deployed position or a retracted position; and
  (i) in response to determining that the at least one door is in a closed configuration and the one or more assist handles are not in a deployed position, actuating, by the first processor in response to the command, the one or more assist handles to move from the retracted position to the deployed position; or
  (ii) in response to determining that the at least one door is in an open configuration and the one or more assist handles are in a deployed position, actuating, by the first processor in response to the command, the assist handle to move from the deployed position to the retracted position,
wherein the first processor comprises an electronic control unit (ECU) of the vehicle, wherein the second processor comprises a body control module (BCM) of the vehicle, and wherein the ECU is configured to actuate, in response to the command received from the BCM, an actuator and a transmission mechanism coupled between the actuator and the one or more assist handles to move the one or more assist handles.

2. The method of claim 1, wherein the deployed position corresponds to a position in which the assist handle is capable of being utilized by a passenger of the vehicle to enter or exit the vehicle through the at least one door.

3. The method of claim 2, wherein the assist handle is invisible to the passenger from the retracted position.

4. The method of claim 2, wherein the retracted position is embedded in or connected with a body side, a roof panel, a headliner, a seat or the at least one door of the vehicle.

5. The method of claim 1, wherein the command to operate the door is received wirelessly by the second processor from a key fob associated with the vehicle before the receiving of the command by the first processor from the second processor.

6. The method of claim 1, wherein the moving of the assist handle between the retracted and deployed positions comprises moving the assist handle between the retracted and deployed positions translationally or rotationally.

7. The method of claim 1, wherein the at least one door comprises at least two doors disposed on a same side of the vehicle and next to one another, and wherein no more than one opening is resulted on the same side for a passenger to enter or exit the vehicle when the at least two doors are opened in response to the command.

8. The method of claim 1, wherein the vehicle comprises an autonomous ridesharing vehicle.

9. The method of claim 1, wherein the one or more assist handles are not moved (i) in response to determining that the at least one door is in a closed configuration and the one or more assist handles are in the deployed position, or (ii) in response to determining that the at least one door is in an open configuration and the one or more assist handles are in the retracted position.

10. The method of claim 1, further comprising:
determining, by one or more pressure sensors, whether a seat in the vicinity of the at least one door is occupied by a passenger,
wherein actuating the one or more assist handles to move from the retracted position to the deployed position is at least partially in response to determining whether the seat is occupied by a passenger.

11. An automated grab handle implementable in a vehicle, comprising:
a handle;
an actuator;
a transmission mechanism coupled between the handle and the actuator; and
an electronic control unit (ECU) configured to:
receive an input to operate at least one door of the vehicle,
identify whether the handle is in a vicinity of the at least one door,
determine whether the at least one door is in an open configuration or a closed configuration,
determine whether the handle is in a deployed position or a retracted position, and
(i) in response to determining that the at least one door is in a closed configuration and the handle is in a retracted position, control the actuator to move the handle from the retracted position to the deployed position via the transmission mechanism; or
(ii) in response to determining that the at least one door is in an open configuration and the handle is in a deployed position, control the actuator to move the handle from the deployed position to the retracted position via the transmission mechanism.

12. The automated grab handle of claim 11, wherein the input is received by the ECU from a body control module (BCM) of the vehicle, and wherein both the ECU and the BCM are disposed in or on the vehicle.

13. The automated grab handle of claim 12, wherein the input is received wirelessly by the BCM from a key fob associated with the vehicle.

14. The automated grab handle of claim 11, wherein the deployed position corresponds to a position in which the handle is capable of being utilized by a passenger of the vehicle to enter or exit the vehicle through the at least one door.

15. The automated grab handle of claim 14, wherein the handle is invisible to the passenger from the retracted position.

16. The automated grab handle of claim 14, wherein the retracted position is embedded in or connected with a body side, a roof panel, a headliner, a seat or the at least one door of the vehicle.

17. The automated grab handle of claim 11, wherein the actuator moves the handle between the retracted and deployed positions translationally or rotationally.

18. The automated grab handle of claim 11, wherein the at least one door comprises at least two doors disposed on a same side of the vehicle and next to one another, and wherein no more than one opening is resulted for a passenger to enter or exit the vehicle when the at least two doors are opened in response to the input.

19. The automated grab handle of claim 11, wherein the vehicle comprises an autonomous ride-sharing vehicle.

20. The automated grab handle of claim 11, wherein the actuator is not actuated (i) in response to determining that the at least one door is in a closed configuration and the handle is in a deployed position, or (ii) in response to determining that the at least one door is in an open configuration and the handle is in a retracted position.

* * * * *